US009555574B2

(12) United States Patent
Sato et al.

(10) Patent No.: US 9,555,574 B2
(45) Date of Patent: Jan. 31, 2017

(54) BLOW MOLDING DEVICE AND A METHOD FOR MANUFACTURING A BLOW MOLDED CONTAINER

(71) Applicant: Discma AG, Hunenberg (CH)

(72) Inventors: Sumito Sato, Tokyo (JP); Nobuyuki Tamura, Tokyo (JP); Takeshi Nagashima, Tokyo (JP)

(73) Assignee: DISCMA AG, Hunenberg (CH)

( * ) Notice: Subject to any disclaimer, the term of this patent is extended or adjusted under 35 U.S.C. 154(b) by 180 days.

(21) Appl. No.: 14/368,967

(22) PCT Filed: Oct. 22, 2012

(86) PCT No.: PCT/JP2012/006739
§ 371 (c)(1),
(2) Date: Jun. 26, 2014

(87) PCT Pub. No.: WO2013/099073
PCT Pub. Date: Jul. 4, 2013

(65) Prior Publication Data
US 2014/0353884 A1     Dec. 4, 2014

(30) Foreign Application Priority Data

Dec. 27, 2011   (JP) ................................. 2011-285564
Dec. 27, 2011   (JP) ................................. 2011-286343

(51) Int. Cl.
*B29C 49/48*        (2006.01)
*B29C 49/58*        (2006.01)
(Continued)

(52) U.S. Cl.
CPC ........... *B29C 49/4802* (2013.01); *B29C 49/28* (2013.01); *B29C 49/58* (2013.01); *B29C 49/06* (2013.01);
(Continued)

(58) Field of Classification Search
None
See application file for complete search history.

(56) References Cited

U.S. PATENT DOCUMENTS 6,464,486 B1 *   10/2002   Barray ................... B29C 49/58
                                                          425/535
2003/0101767 A1    6/2003   Hyre et al.
(Continued)

FOREIGN PATENT DOCUMENTS

JP          A-04-173131       6/1992
JP          2003201129        7/2003
(Continued)

OTHER PUBLICATIONS

Jul. 1, 2014 International Preliminary Report on Patentability issued in International Application No. PCT/JP2012/006739 (with translation).
Jan. 29, 2013 Written Opinion issued in International Application No. PCT/JP2012/006739 (with translation).
Jan. 29. 2013 International Search Report issued in International Application No. PCT/JP2012/006739.

*Primary Examiner* — Monica Huson
(74) *Attorney, Agent, or Firm* — Eric J. Sosenko; Jonathan P. O'Brien; Honigman Miller Schwartz and Cohn LLP

(57) ABSTRACT

To effectively prevent a mouth portion of a preform from being deformed and enlarged in diameter during blow molding, provided is a blow molding device that includes: a blow mold inside which a cavity is provided for accommodating therein a preform, except for a mouth portion which is an orifice end of the preform, the preform being preformed in a bottomed tubular shape; a blow nozzle provided to supply a pressurized fluid into the preform through the mouth portion of the preform; a partition wall member that tightly surrounds an outer wall surface of the mouth portion of the preform; with space being formed between the partition wall member and the outer wall surface; and a pressurized fluid
(Continued)

supply unit that supplies a pressurized fluid into the space during blow molding.

16 Claims, 2 Drawing Sheets

(51) Int. Cl.
*B29C 49/28* (2006.01)
*B29C 49/06* (2006.01)
*B29C 49/12* (2006.01)
*B29K 101/12* (2006.01)
*B29L 31/00* (2006.01)

(52) U.S. Cl.
CPC ........ *B29C 49/12* (2013.01); *B29C 2049/5803* (2013.01); *B29K 2101/12* (2013.01); *B29L 2031/712* (2013.01); *B29L 2031/7158* (2013.01)

(56) References Cited

U.S. PATENT DOCUMENTS

| | | |
|---|---|---|
| 2008/0000268 A1 | 1/2008 | Hyre et al. |
| 2010/0151073 A1* | 6/2010 | Daniel ............... B29C 49/58 425/522 |
| 2010/0313602 A1 | 12/2010 | Hyre et al. |

FOREIGN PATENT DOCUMENTS

| | | |
|---|---|---|
| JP | A-2003-201129 | 7/2003 |
| JP | A-2003-251685 | 9/2003 |
| JP | H4173131 | 10/2008 |
| JP | 2009166482 | 7/2009 |
| JP | A-2009-166482 | 7/2009 |
| JP | 2011105019 | 6/2011 |
| JP | A-2011-105019 | 6/2011 |

* cited by examiner

BLOW MOLDING DEVICE AND A METHOD FOR MANUFACTURING A BLOW MOLDED CONTAINER

TECHNICAL FIELD

The present invention relates to a blow molding device that is configured to manufacture a blow molded container by blow molding a preform formed in a bottomed tubular shape and a method for manufacturing a blow molded container, and in particular to a blow molding device and a method that are designed to prevent deformation of a mouth portion of the preform during blow molding.

BACKGROUND ART

A blow molded container is obtained by performing a bottomed tubular preform with use of a thermoplastic resin material, and subsequently blow molding the preform. Since such a blow molded container has a high degree of flexibility in shape and is inexpensive, light in weight, and excellent in recyclability, the blow molded container is widely used as a container to be filled with a cosmetic product, a pharmaceutical product, a beverage product, or the like.

Generally, when a preform is blow molded in a blow mold, a trunk portion of the preform is accommodated in a blow mold, while a mouth portion as an orifice end of the preform is held by a holding jig from an inner wall side or an outer wall side of the mouth portion. Then, blow air is injected by means of the holding jig. Although sealing is established between the mouth portion of the preform and the holding jig so as to prevent leakage of the blow air, in order to allow the preform or a blow molded container to be detachable with respect to the holding jig, the mouth portion of the preform is loosely fitted to the holding jig. (Refer to Patent Literature 1 indicated below.) As a result, in correspondence with play between the mouth portion of the preform and the holding jig, there is a concern that the mouth portion might be deformed and enlarged in diameter due to a difference in pressure arising inside and outside the mouth portion when the blow air is injected.

CITATION LIST

Patent Literature

PTL 1: JP2003251685A

SUMMARY OF THE INVENTION

Technical Problems

In view of the above, the present invention is to provide a blow molding device and a method for manufacturing a blow molded container that are capable of effectively preventing the mouth portion of the preform from being deformed and enlarged in diameter during blow molding.

Solution to Problems

The present invention has been conceived in order to solve the aforementioned problem, and a first aspect of the present invention resides in a blow molding device, including: a blow mold inside which a cavity is provided for accommodating therein a preform, except for a mouth portion which is an orifice end of the preform, the preform being preformed in a bottomed tubular shape; a blow nozzle provided to supply a pressurized fluid into the preform through the mouth portion of the preform; a partition wall member that tightly surrounds an outer wall surface of the mouth portion of the preform with space being formed between the partition wall member and the outer wall surface; and a pressurized fluid supply unit that supplies a pressurized fluid into the space during blow molding.

A second aspect of the present invention resides in the blow molding device according to the first aspect, preferably further including: a driving mechanism that drives the blow nozzle together with the partition wall member closer to and away from the blow mold.

A third aspect of the present invention resides in the blow molding device according to the first or the second aspect, wherein, preferably, the blow nozzle includes a flat surface facing an upper end of the mouth portion, and a seal element is provided between the upper end of the mouth portion and the flat surface, the seal element sealing an inside of the preform from the space.

A fourth aspect of the present invention resides in the blow molding device according to any one of the first to the third aspect, wherein, preferably, the blow nozzle includes a guide tube that is inserted into the mouth portion and that has a tip end whose diameter is decreased.

A fifth aspect of the present invention resides in the blow molding device according to any one of the first to the fourth aspect, wherein, preferably, the preform includes a neck ring in a lower end of the mouth portion, and the partition wall member has a lower end that is configured to tightly abut against the neck ring included in the preform.

A sixth aspect of the present invention resides in the blow molding device according to any of the first to the fifth aspect, wherein, preferably, the pressurized fluid supply unit supplies the pressurized fluid into the space at a pressure that is substantially equal to a pressure of the pressurized fluid supplied into the preform.

A seventh aspect of the present invention resides in the blow molding device according to any of the first to the sixth aspect, wherein, preferably, the pressurized fluid supplied by means of the blow nozzle includes a liquid, and the pressurized fluid supplied by means of the pressurized fluid supply unit includes a gas.

An eighth aspect of the present invention resides in a method for manufacturing a blow molded container in which a preform, except for a mouth portion of the preform, is accommodated in a blow mold, and in which a pressurized fluid is supplied into the preform through the mouth portion for blow molding the preform, the preform being preformed in a bottomed tubular shape, the method including the step of simultaneously with the supply of the pressurized fluid into the preform through the mouth portion, supplying a pressurized fluid to an outer wall surface side of the mouth portion so as to pressurize the outer wall surface.

A ninth aspect of the present invention resides in the method for manufacturing a blow molded container according the eighth aspect, wherein, preferably, the pressurized fluid is supplied to the outer wall surface side of the mouth portion at a pressure that is substantially equal to a pressure of the pressurized fluid supplied into the preform.

A tenth aspect of the present invention resides in the method for manufacturing a blow molded container according to the eighth or the ninth aspect, wherein, preferably, the pressurized fluid supplied into the preform includes a liquid, and the pressurized fluid supplied to the outer wall surface side of the mouth portion includes a gas.

An eleventh aspect of the present invention resides in the blow molding device according to the first aspect, wherein, preferably, the pressurized fluid that the blow nozzle supplies is a first pressurized fluid, and the pressurized fluid that the pressurized fluid supply unit supplies is a second pressurized fluid. The blow molding device further includes a pressurizing unit that supplies the first pressurized fluid to the blow nozzle through a pipe, the pipe from the pressurizing unit to the blow nozzle being diverged to allow a part of the first pressurized fluid to be utilized as a pressurizing means for the pressurized fluid supply unit.

A twelfth aspect of the present invention resides in the blow molding device according to the eleventh aspect, wherein, preferably, the first pressurized fluid includes a liquid, and the second pressurized fluid includes a gas.

A thirteenth aspect of the present invention resides in the blow molding device according to any one the eleventh to the fourteenth aspect, wherein, preferably, a stretching rod is inserted and disposed in the blow nozzle.

A fourteenth aspect of the present invention resides in the method for manufacturing a blow molded container according to the eighth aspect, wherein, preferably, the pressurized fluid supplied into the preform is a first pressurized fluid, and the pressurized fluid supplied to the outer wall surface side of the mouth portion is a second pressurized fluid. Furthermore, preferably, a pressurizing unit is provided to supply the first pressurized fluid into the preform through the mouth portion by means of the blow nozzle, and a pressurized fluid supply unit is provided to supply the second pressurized fluid to the outer wall surface side of the mouth portion, the pressurized fluid supply unit utilizing a part of the first pressurized fluid as a pressurizing means.

Advantageous Effects of Invention

According to the present invention, with the structure in which the sealed space is formed on an outer side of the mouth portion of the preform and in which a pressurized fluid is supplied to the space, a difference in pressure between an inner wall surface side and the outer wall surface side of the mouth portion is reduced. As a result, the mouth portion is prevented from being deformed and enlarged in diameter due to the difference in pressure.

BRIEF DESCRIPTION OF DRAWINGS

The present invention will be further described below with reference to the accompanying drawings, wherein.

DESCRIPTION OF EMBODIMENTS

Figure 1:
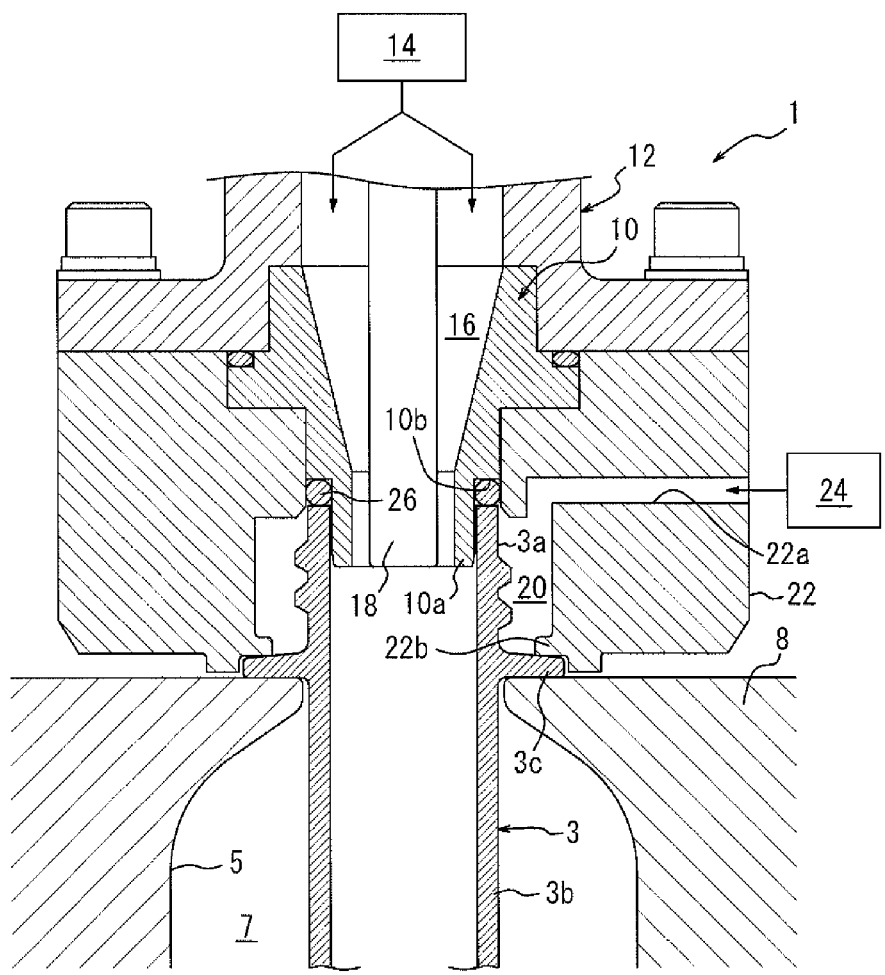
FIG. 1 is a sectional view illustrating a part of a blow molding device according to one embodiment of the present invention.

The following describes embodiments according to the present invention in detail with reference to the drawings. FIG. 1 is a sectional view illustrating a part of a blow molding device according to one embodiment of the present invention. The blow molding device 1 is configured to blow mold a preform 3, which is preformed in a bottomed tubular shape, into a predetermined container shape. In the illustrated example, the preform 3 includes: a mouth portion 3a which is an orifice end of the preform 3: a trunk portion 3b extending contiguously from the mouth portion 3a to block a lower end; and a neck ring 3c annularly projecting between the mouth portion 3a and the trunk portion 3b. However, the shape of the preform 3 is not limited to the illustrated example. The mouth portion 3a has an outer wall provided with screws. However, the preform 3 may also include an engaging portion such as an undercut instead of the screws.

As illustrated in FIG. 1, the blow molding device 1 includes a blow mold 8 of a matched metal mold type and a blow nozzle 10. The blow mold 8 includes a mold surface 5 corresponding to a final shape of the blow molded container such as a bottle, and with the mold surface 5, a cavity is defined inside the blow mold 8. The blow nozzle 10 is provided to supply a pressurized fluid into the preform 3 through the mouth portion 3a of the preform 3. In the figure, reference numeral 12 refers to a support block configured to support the blow nozzle 10.

The blow nozzle 10 is connected to a pressure source 14. The blow nozzle 10 includes a passage 16 configured to define an inlet for receiving the pressurized fluid from the pressure source 14 and an outlet for delivering the pressurized fluid into the preform 3. The blow nozzle 10 also includes a guide tube 10a that is inserted into the mouth portion 3a of the preform 3 and that has a tip end whose diameter is decreased. It is preferable that the guide tube 10a included in the blow nozzle 10 has an outer diameter that is smaller than an inner diameter of the mouth portion 3a (i.e., gap is formed between an outer wall surface of the guide tube 10a and an inner wall surface of the mouth portion 3a). With the above structure, when the guide tube 10a is inserted into the mouth portion 3a of the preform 3, the guide tube 10a is prevented from being rubbed against the inner wall surface of the mouth portion 3a and damaging the inner wall surface of the mouth portion 3a. Furthermore, the single blow nozzle 10 may be used for preforms 3 with a variety of mouth portion diameters, and the device is simplified. It is preferable that the pressurized fluid to be supplied from the pressure source 14 is a liquid, in particular, a content liquid that is to be filled into the blow molded container as a product. A gas (e.g. air) may also be used as the pressurized fluid.

In the passage 16 included in the blow nozzle 10, a stretching rod 18 is coaxially inserted and disposed. By driving an actuator (which is not illustrated) downward while a tip portion of the stretching rod 18 is in abutment with an inner circumferential surface of a bottom portion of the preform 3, the preform 3 is vertically stretched. Depending on conditions of blow molding, the stretching rod 18 may be omitted. When the stretching rod 18 is not used, an effective opening area (an opening area in which the pressurized fluid may pass) in the passage 16 is increased, and a speed of the pressure rise is increased. Consequently, molding time is reduced.

The blow molding device 1 further includes a partition wall member 22 and a pressurized fluid supply unit 24. The partition wall member 22 is configured to tightly (air-tightly or liquid-tightly) surround an outer wall surface of the mouth portion 3a included in the preform 3, while forming space 20 between the partition wall member 22 and the outer wall surface. The pressurized fluid supply unit 24 is configured to supply a pressurized fluid into the space 20 during blow molding.

The partition wall member 22, along with the blow nozzle 10, is supported by the support block 12. The partition wall member 22 is provided inside thereof with a passage 22a that is connected to the pressurized fluid supply unit 24 and that is open to the space 20. The partition wall member 22 is also provided, in a lower end portion thereof, with an annular rib 22b configured to tightly abut against an upper surface of the neck ring 3c included in the preform 3 that is supported by an upper surface of the blow mold 8. Although not illustrated, it is also possible to bring the lower end of the partition wall member 22 into tight contact with the upper surface of the blow mold 8, so that the tightly sealed space 20 is formed between the outer wall surface of the mouth portion 3a included in the preform 3, the upper surface of the blow mold 8, and the partition wall member 22.

The pressurized fluid supply mans 24 may be anything that is capable of supplying the pressurized fluid to the space 20 formed between the outer wall surface of the mouth portion 3a and the partition wall member 22. Some examples of the pressurized fluid supply unit 24 include a pressurizing pump or a compressor that are conventionally known. As the pressurized fluid, it is preferable to use a gas such as air that is regulated at a constant pressure. It is more preferable to use a gas at a pressure substantially equal to a pressure of the pressurized fluid supplied into the preform 3. The phrase "substantially equal to" herein encompasses a case where the pressure of the pressurized fluid supplied to the space 20 is perfectly equal to the pressure of the pressurized fluid supplied into the preform 3, and a case where the pressure of the pressurized fluid supplied to the space 20 is different from the pressure of the pressurized fluid supplied into the preform 3 by a pressure difference that is not great enough to deform the mouth portion 3a included in the preform 3 during blow molding.

In the present embodiment, the blow nozzle 10 also includes a flat surface 10b extending radially outward from a base end of the guide tube 10a to face an upper end of the mouth portion 3a. Between the upper end of the mouth portion 3a and the flat surface 10b, there is also provided a seal element 26 such as an o-ring that is configured to seal an inside of the preform 3 from the space 20.

In the present embodiment, the blow molding device 1 includes a driving mechanism (which is not illustrated) configured to drive the blow nozzle 10 together with the partition wall member 22 closer to and away from the blow mold 8 in an axis direction. As the driving mechanism, it is possible to use a known mechanism in which an actuator such as an electrical motor, a hydraulic cylinder, or the like is employed.

Next, a description is given of a method for manufacturing a blow molded container with use of the blow molding device 1 with the above structure. To begin with, the heated and softened preform 3, except for the mouth portion 3a included in the preform 3, is arranged in the blow mold 8, and mold closing is performed. Subsequently, by operation of the driving mechanism, the blow nozzle 10 together with the partition wall member 22 is moved closer to the blow mold 8, so that the guide tube 10a included in the blow nozzle 10 is inserted into the mouth portion 3a of the preform 3. As a result, the tightly sealed space 20 is formed between the outer wall surface of the mouth portion 3a included in the preform 3 and the partition wall member 22. In the above state, the pressurized fluid is supplied into the preform 3 through the mouth portion 3a by means of the blow nozzle 10 for blow molding, and simultaneously, the pressurized fluid is supplied to the space 20 by means of the pressurized fluid supply unit 24. At this time, in a case of biaxial stretch blow molding, the preform 3 is vertically stretched by means of the stretching rod 8. When the blow molding is completed, the supply of the pressurized fluid to the space 20 is stopped. Then, the blow nozzle 10 and the partition wall member 22 are driven upward by means of the driving mechanism, and the blow nozzle 10 and the partition wall member 22 are removed from the mouth portion of the molded container. As described above, the pressurized fluid supplied into the preform 3 and the pressurized fluid supplied into the space 20 are preferably a combination of a "liquid" and a "gas." However, a combination of a "liquid" and a "liquid", a combination of a "gas" and a "liquid", or a combination of a "gas" and a "gas" may also be possible.

Thus, according to the blow molding device 1 of the present embodiment, with the structure in which the tightly sealed space 20 is formed outside the mouth portion 3a included in the preform 3 and in which the pressurized fluid is supplied also to the space 20 during blow molding, the difference in pressure between the inner wall surface side and the outer wall surface side of the mouth portion 3a is reduced or zeroed. As a result, mouth portion 3a is prevented from being deformed and enlarged in diameter due to the difference in pressure. Furthermore, in a conventional method in which preforms are held by means of holding jigs, it is necessary to additionally prepare a holding jig in accordance with a mouth portion diameter of each preform and a fitting shape of the outer wall of the mouth portion. On the other hand, according to the blow molding device 1, since the blow nozzle 10 and the partition wall member 22 are not fitted to the mouth portion 3a, the common blow nozzle 10 and partition wall member 22 may be used for preforms 3 with different mouth portion diameters and different fitting shapes of the outer walls. As a result, the blow molding device 1 that is inexpensive is provided.

Moreover, according to the blow molding device 1 of the present embodiment, since the blow nozzle 10 is provided with the flat surface 10b facing the upper end of the mouth portion 3a, and since the seal element 26 configured to seal the inside of the preform 3 from the space 20 is provided between the upper end of the mouth portion 3a and the flat surface 10b, sealing is established between the inside of the preform 3 and the space 20 near the outer wall surface of the mouth portion 3a by means of the single seal element 26. As a result, the structure of the blow molding device 1 is simplified.

Moreover, according to the blow molding device 1 of the present embodiment, since the blow nozzle 10 is provided with the guide tube 10a that is inserted into the mouth portion 3a and that has the tip end whose diameter is decreased, the blow nozzle 10 and the partition wall member 22 are set up easily and reliably with respect to the mouth portion 3a included in the preform 3.

Moreover, according to the blow molding device 1 of the present embodiment, since the lower end of the partition wall member 22 is configured to tightly abut against the neck ring 3c included in the preform 3, a position of the preform 3 during blow molding is stabilized, and the blow molded container of a better quality is manufactured.

Moreover, in the blow molding device 1 of the present embodiment, when the pressure of the pressurized fluid supplied to the space 20 is substantially equal to the pressure of the pressurized fluid supplied into the preform 3, the mouth portion 3a is more reliably prevented from being deformed and enlarged in diameter during blow molding.

Moreover, when the pressurized fluid supplied from the pressure source 14 is the content liquid to be filled in the blow molded container as the product, the process of filling the content may be omitted, and a production line may be simplified. When the fluid supplied by means of the pressurized fluid supply unit 24 is a liquid, it is preferable to additionally provide a means for collecting the liquid within the space 20 after blow molding is completed. However, when the fluid supplied by means of the pressurized fluid supply unit 24 is a gas, there is no need for providing such a means, and it is only necessary to discharge the gas within the space 20 by moving the blow nozzle 10 and the partition wall member 22 away from the blow mold 8 after the blow molding is completed. As a result, the device is further simplified.

Figure 2:
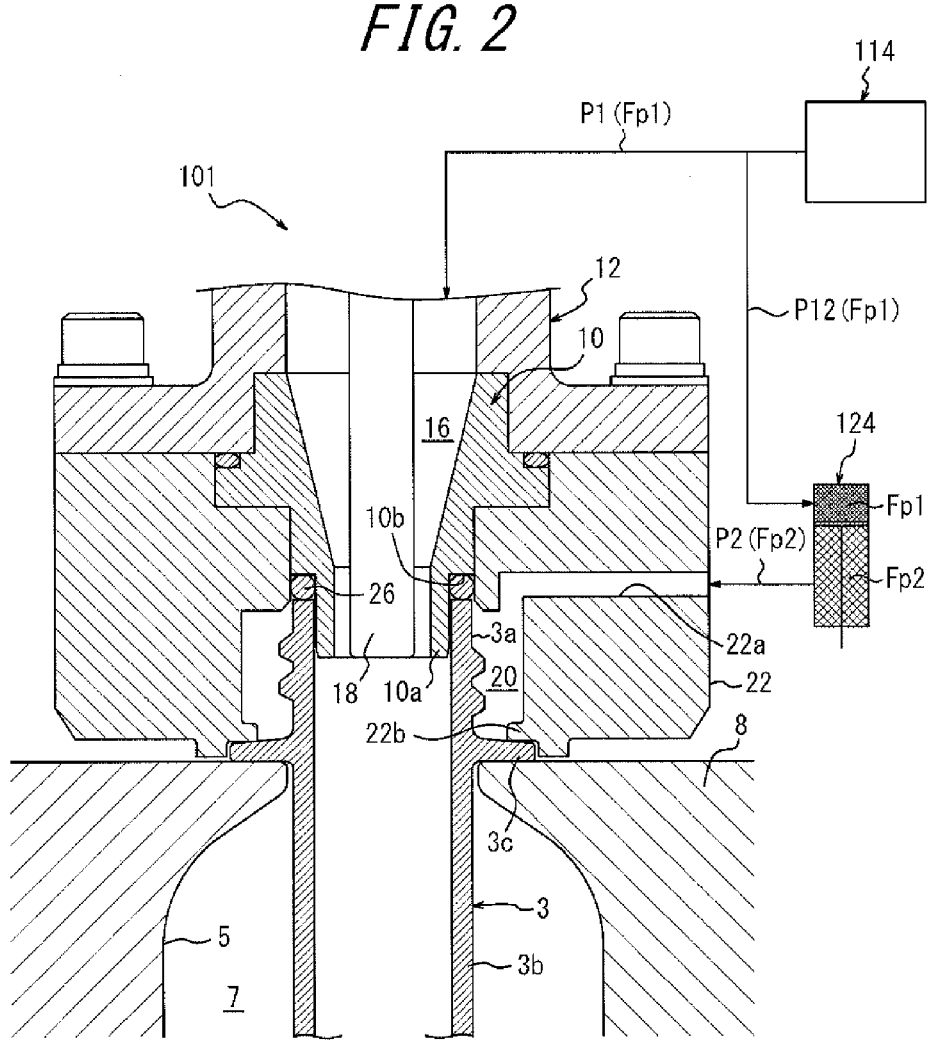
FIG. 2 is a sectional view illustrating a part of a blow molding device according to another embodiment of the present invention.

Next, a description is given of another embodiment of the present invention with reference to FIG. 2. FIG. 2 is a sectional view illustrating a part of a blow molding device according to the other embodiment of the present invention. In FIG. 2, the same structures as those illustrated in FIG. 1 described above are denoted by the same reference numerals, and a description there of is omitted. In the present embodiment, the pressurized fluid that the blow nozzle 10 supplies is a first pressurized fluid Fp1, and the pressurized fluid that the pressurized fluid supply unit 124 supplies is a second pressurized fluid Fp2. As the pressure source configured to supply the first pressurized fluid Fp1 to the blow nozzle 10, a pressurizing unit 114 is used. As the pressurized fluid supply unit 124, the one in the form of a plunger pump is used.

The pressurizing unit 114, which is configured to supply the first pressurized fluid Fp1 used for blow molding the preform 3 through a pipe P1, is conventionally an indispensable unit and is a large-sized unit such as a pressurizing pump, a compressor, or the like.

On the other hand, the pressurized fluid supply unit 124, which is configured to supply the second pressurized fluid Fp2 to the space 20, utilizes, as the pressurizing means, a part of the first pressurized fluid Fp1 introduced through a pipe P12. The pipe P1 diverges to form the pipe P12. As described above, the illustrated pressurized fluid supply unit 124 is in the form of a plunger pump, and the pressure of the first pressurized fluid Fp1 introduced to an upper compartment through the pipe P12 pressurizes the fluid in a lower compartment. Then, the pressurized fluid Fp2 that is pressurized to an appropriate pressure is supplied to the passage 22a provided in the partition wall member 22 through the pipe P2. In this way, the pressurized fluid supply unit 124 utilizes the first pressurized fluid Fp1 as the pressure source, that is, a power source. Accordingly, the second pressurized fluid Fp2 is supplied without the need for additionally providing a pressurizing unit and for changing the structure of a conventional molding device significantly. The pressurized fluid supply unit 124 may be formed in the form of, for example, a cylinder with a built-in piston that includes two compartments instead of in the form of the illustrated plunger pump.

Next, a description is given of a method for manufacturing a blow molded container with use of the blow molding device 101 with the above structure. To begin with, similarly to the example illustrated in FIG. 1 described above, the preform 3 is arranged in the blow mold 8, and the guide tube 10a included in the blow nozzle 10 is inserted into the mouth portion 3a included in the preform 3. In the above state, the first pressurized fluid Fp1 is supplied from the pressurizing unit 114 into the preform 3 by means of the blow nozzle 10 so as to inflate and deform the preform 3, and simultaneously, the second pressurized fluid Fp2 is supplied from the pressurized fluid supply unit 124 to the space 20 through the pipe P2 and the passage 22a. The pressurized fluid supply unit 124 utilizes a part of the first pressurized fluid Fp1 as the pressurizing means. At this time, in the case of biaxial stretch blow molding, the preform 3 is vertically stretched by means of the stretching rod 8. Processes performed after blow molding is completed are the same as those in the example illustrated in FIG. 1 described above.

Thus, according to the blow molding device 101 of the present embodiment, the pressurized fluid that the blow nozzle 10 supplies is the first pressurized fluid Fp1, and the pressurized fluid that the pressurized fluid supply unit 124 supplies is the second pressurized fluid Fp2. The blow molding device 101 of the present embodiment further includes the pressurizing unit 114 that supplies the first pressurized fluid Fp1 to the blow nozzle 10 through the pipe P1. The pipe P1 from the pressurizing unit 114 to the blow nozzle 10 is diverged to allow a part of the first pressurized fluid Fp1 to be utilized as the pressurizing means for the pressurized fluid supply unit 124. With the above structure, as for the supply means for the second pressurized fluid Fp2, it is not necessary to additionally provide a second pressurizing unit, such as a compressor, a pump, or the like, that requires a large power source. Furthermore, since the pressurizing unit 114 configured to supply the first pressurized fluid Fp1 is a unit commonly installed in blow molding devices, the second pressurized fluid Fp2 is supplied without changing the structure of a conventional device significantly.

Although the blow molding device according to the various embodiments of the present invention has been described, as noted everywhere in the above description, the present invention is not limited to the above embodiments. The above examples of the device according to the present invention are suitable for molding a bottle made of a synthetic resin such as PET resin, polypropylene resin, or the like, by biaxial stretch blow molding. However, the device according to the present invention is not limited to biaxial stretch blow molding and may be used for blow molding in which preforms are inflated and deformed to be shaped into containers in a general manner.

INDUSTRIAL APPLICABILITY

The present invention makes it possible to effectively prevent the mouth portion of the preform from being deformed and enlarged in diameter during blow molding.

REFERENCE SIGNS 1 blow molding device
3 preform
3a mouth portion of preform
3b trunk portion of preform
3c neck ring
7 cavity
8 blow mold
10 blow nozzle
10a guide tube
10b flat surface
14 pressure source
18 stretching rod
20 space
22 partition wall member
24 pressurized fluid supply unit
26 seal element
101 blow molding device
114 pressurizing unit
124 pressurized fluid supply unit
Fp1 first pressurized fluid
Fp2 second pressurized fluid
P1, P12, P2 pipe

The invention claimed is:
1. A blow molding device, comprising:
a blow mold inside which a cavity is provided for accommodating therein a preform, except for a mouth portion which is an orifice end of the preform, the preform being performed in a bottomed tubular shape;

a blow nozzle provided to supply a first pressurized fluid into the preform through the mouth portion of the preform;

a partition wall member that tightly surrounds an outer wall surface of the mouth portion of the preform with space being formed between the partition wall member and the outer wall surface; and a pressurized fluid supply unit that supplies a second pressurized fluid into the space during blow molding.

2. The blow molding device according to claim 1, further comprising:

a driving mechanism that drives the blow nozzle together with the partition wall member closer to and away from the blow mold.

3. The blow molding device according to claim 1, wherein the blow nozzle includes a flat surface facing an upper end of the mouth portion, and a seal element is provided between the upper end of the mouth portion and the flat surface, the seal element sealing an inside of the preform from the space.

4. The blow molding device according the claim 1, wherein the blow nozzle includes a guide tube that is inserted into the mouth portion and that has a tip end whose diameter is decreased.

5. The blow molding device according to claim 1, wherein the preform includes a neck ring in a lower end of the mouth portion, and the partition wall member has a lower end that is configured to tightly abut against the neck ring included in the preform.

6. The blow molding device according to claim 1, wherein the pressurized fluid supply unit supplies the second pressurized fluid into the space at a pressure that is substantially equal to a pressure of the first pressurized fluid supplied into the preform.

7. The blow molding device according to claim 1, wherein the first pressurized fluid supplied by means of the blow nozzle comprises a liquid, and the second pressurized fluid supplied by means of the pressurized fluid supply unit comprises a gas.

8. A method for manufacturing a blow molded container in which a preform, except for a mouth portion of the preform, is accommodated in a blow mold, and in which a first pressurized fluid is supplied into the preform through the mouth portion for blow molding the preform, the preform being preformed in a bottomed tubular shape, the method comprising the step of:

simultaneously with the supply of the first pressurized fluid into the preform through the mouth portion, supplying a second pressurized fluid to an outer wall surface side of the mouth portion so as to pressurize the outer wall surface.

9. The method for manufacturing a blow molded container according to claim 8, wherein the second pressurized fluid is supplied to the outer wall surface side of the mouth portion at a pressure that is substantially equal to a pressure of the first pressurized fluid supplied into the preform.

10. The method for manufacturing a blow molded container according to claim 8, wherein the first pressurized fluid supplied into the preform comprises a liquid, and the second pressurized fluid is supplied to the outer wall surface side of the mouth portion comprises a gas.

11. The blow molding device according to claim 1, wherein the blow molding device further comprises a pressurizing unit that supplies the first pressurized fluid to the blow nozzle through a pipe, the pipe from the pressurizing unit to the blow nozzle being diverged to allow a port of the first pressurized fluid to be utilized as a pressurizing means for the pressurized fluid supply unit.

12. The blow molding device according to claim 11, wherein the first pressurized fluid comprises a liquid, and the second pressurized fluid comprises a gas.

13. The blow molding device of claim 11, wherein the blow nozzle includes a guide tube that is inserted into the mouth portion and that a tip end whose diameter is decreased, and the blow nozzle includes a flat surface facing an upper end of the mouth portion, and a seal element is provided between the upper end of the mouth portion and the flat surface, the seal element sealing an inside of the preform from the space.

14. The blow molding device according to claim 11, wherein the preform includes a neck ring in a lower end of the mouth portion, and the partition wall member has a lower end that is configured to tightly abut against the neck ring included in the preform.

15. The blow molding device according to claim 11, wherein a stretching rod is inserted and disposed in the blow nozzle.

16. The method for manufacturing a blow molded container according to claim 8, wherein a pressurizing unit is provided to supply the first pressurized fluid into the preform through the mouth portion by means of the blow nozzle, and a pressurized fluid supply unit is provided to supply the second pressurized fluid to the outer wall surface side of the mouth portion, the pressurized fluid supply unit utilizing a part of the first pressurized fluid as a pressurizing means.

* * * * *